(12) United States Patent
Junk et al.

(10) Patent No.: US 9,008,804 B2
(45) Date of Patent: Apr. 14, 2015

(54) METHOD AND APPARATUS FOR OPERATING FIELD DEVICES VIA A PORTABLE COMMUNICATOR

(75) Inventors: Kenneth W. Junk, Marshalltown, IA (US); Bruce F. Grumstrup, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 638 days.

(21) Appl. No.: 12/631,316

(22) Filed: Dec. 4, 2009

(65) Prior Publication Data
US 2010/0145476 A1 Jun. 10, 2010

Related U.S. Application Data

(60) Provisional application No. 61/120,267, filed on Dec. 5, 2008.

(51) Int. Cl.
*G05B 11/01* (2006.01)
*G05D 7/00* (2006.01)
(Continued)

(52) U.S. Cl.
CPC .... *G05B 19/042* (2013.01); *G05B 2219/23406* (2013.01); *G05B 2219/25274* (2013.01); *G05B 2219/25428* (2013.01)

(58) Field of Classification Search
CPC ........... G05B 2219/31121; G05B 2219/25428; G05B 2219/36159; G05B 2219/25006; G05B 2219/25008; G05B 2219/25014; H04L 69/18; H04W 28/18; F16K 31/00; F16K 37/0041; G06Q 20/32; H04Q 2209/86
USPC ................... 700/2, 6, 7, 17, 19, 20, 275, 282; 702/85, 108, 122, 123, 182–185, 188; 340/4.3, 5.1, 5.2, 500, 501, 531, 533, 340/539.1, 539.22–539.24; 455/41.2, 66.1, 455/73, 74, 74.1, 90.1, 90.3, 91, 95, 455/418–420, 422.1, 423, 424
See application file for complete search history.

(56) References Cited

U.S. PATENT DOCUMENTS

| 5,960,214 A | 9/1999 | Sharpe, Jr. et al. |
| 6,898,542 B2 * | 5/2005 | Ott et al. .................. 702/108 |

(Continued)

FOREIGN PATENT DOCUMENTS

| CN | 1804744 A | 7/2006 |
| CN | 2833675 Y | 11/2006 |

(Continued)

OTHER PUBLICATIONS

International Search Report for PCT/US2009/066628, mailed May 19, 2010.
(Continued)

*Primary Examiner* — Crystal J Barnes-Bullock
(74) *Attorney, Agent, or Firm* — Marshall, Gerstein & Borun LLP (57) ABSTRACT

A portable communicator for operating a field device. The portable communicator is configured to communicate with the field device to configure and/or analyze performance of a field device in an efficient manner. In some embodiments, the portable communicator includes an intuitive user interface that allows the user to perform a relatively limited set of preconfigured procedures on a field device. The portable communicator may communicate with the field device via a wire and/or wirelessly. In one embodiment, the portable communicator is a Bluetooth-enabled smartphone, a PDA, a pocket PC, or any Bluetooth-enabled generic mobile communication device. The portable communicator may communicate with the field device via a wireless communication unit (e.g., Bluetooth modem) coupled to the field device. In a process plant environment, in which the field device is coupled to a controller, the portable communicator may communicate with the field device without communicating with the controller.

21 Claims, 6 Drawing Sheets

(51) Int. Cl.
  G05D 11/00    (2006.01)
  G06F 11/00    (2006.01)
  G08B 1/08     (2006.01)
  H04B 7/00     (2006.01)
  H04B 1/40     (2006.01)
  H04B 1/034    (2006.01)
  G05B 19/042   (2006.01)

(56) References Cited

U.S. PATENT DOCUMENTS

| | | | | |
|---|---|---|---|---|
| 6,959,356 | B2 * | 10/2005 | Packwood et al. | 710/315 |
| 7,010,294 | B1 * | 3/2006 | Pyotsia et al. | 455/420 |
| 7,085,623 | B2 | 8/2006 | Siegers | |
| 7,317,927 | B2 * | 1/2008 | Staton et al. | 455/456.4 |
| 7,426,452 | B2 * | 9/2008 | Zielinski et al. | 702/184 |
| 7,559,529 | B2 * | 7/2009 | Affaticati et al. | 251/129.04 |
| 7,640,007 | B2 * | 12/2009 | Chen et al. | 455/414.1 |
| 7,660,701 | B2 * | 2/2010 | Sharpe, Jr. | 702/183 |
| 7,869,805 | B2 * | 1/2011 | Schnaare et al. | 455/434 |
| 8,005,514 | B2 * | 8/2011 | Saito et al. | 455/572 |
| 2004/0034448 | A1 | 2/2004 | Siegers | |
| 2005/0164684 | A1 | 7/2005 | Chen et al. | |
| 2005/0228509 | A1 | 10/2005 | James | |
| 2005/0285716 | A1 * | 12/2005 | Denison et al. | 340/5.2 |
| 2007/0262847 | A1 | 11/2007 | Grabinger et al. | |
| 2008/0268784 | A1 * | 10/2008 | Kantzes et al. | 455/66.1 |
| 2008/0290986 | A1 * | 11/2008 | Laughlin-Parker et al. | 340/3.8 |
| 2009/0111378 | A1 * | 4/2009 | Sheynman et al. | 455/41.1 |
| 2009/0265583 | A1 * | 10/2009 | Bouse et al. | 714/37 |
| 2009/0311971 | A1 * | 12/2009 | Kielb et al. | 455/74.1 |
| 2009/0311975 | A1 * | 12/2009 | Vanderaa et al. | 455/90.3 |
| 2010/0222895 | A1 * | 9/2010 | Seiler | 700/16 |

FOREIGN PATENT DOCUMENTS

| | | |
|---|---|---|
| CN | 1969239 A | 5/2007 |
| CN | 101112077 A | 1/2008 |
| CN | 101299299 A | 11/2008 |
| EP | 0 957 418 A2 | 11/1999 |
| WO | WO-03/023536 A1 | 3/2003 |
| WO | WO-2006/053211 A3 | 5/2006 |
| WO | WO-2006053211 A2 | 5/2006 |
| WO | WO-2008/127580 A3 | 10/2008 |
| WO | WO-2008127580 A2 | 10/2008 |

OTHER PUBLICATIONS

Written Opinion of the International Searching Authority for PCT/US2009/066628, mailed May 19, 2010.

China State Intellectual Property Office second office action for Chinese Application No. 200980149169.0, dated Oct. 25, 2013.

China State Intellectual Property Office first office action for Chinese Application No. 200980149169.0, dated Mar. 5, 2013.

Communication pursuant to Article 94(3) EPC issued May 17, 2013 by the European Patent Office for European Application No. 09 802 057.1-1807 (9 pages).

Office Action for Russian Application No. 2011124743, dated Dec. 19, 2013.

Third Office Action for Chinese Application No. 200980149169.0, dated Feb. 7, 2014.

Examination Report for Gulf Cooperation Council Application No. GCC/P/2009/14846, dated Aug. 6, 2014.

* cited by examiner

METHOD AND APPARATUS FOR OPERATING FIELD DEVICES VIA A PORTABLE COMMUNICATOR

FIELD OF THE INVENTION

The present invention relates generally to process control networks and, more particularly, to operating field devices via a portable communicator.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART®. protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Various techniques have been developed for analyzing the performance and detecting problems with various field devices. In one technique, for example, a "signature" of a valve is captured when the valve is first commissioned. For instance, the system may stroke the valve from 0 to 100% and record the amount of air pressure required to move the valve through its full cycle. This "signature" is then used to monitor the actual air pressure against the signature air pressure and alert a maintenance technician when the deviation is too great.

Using other known techniques (e.g., disclosed in the U.S. Pat. No. 6,466,893, entitled "Statistical Determination of Estimates of Process Control Loop Parameters," hereby expressly incorporated by reference herein), it is possible to determine estimates of one or more process loop parameters, such as friction, dead band, dead time, oscillation, shaft windup or backlash of a process control device. In particular, it is possible to collect signal data related to an output parameter and to an input parameter, store the signal data as a series of discrete points, eliminating some of the points in the series according to a predefined algorithm, and performing a statistical analysis of the reduced series to obtain an average value of one or more process control parameters. This allows estimating average actuator friction for a sliding stem valve, for example.

In some cases, it may be difficult to use the process control system to analyze performance and detect problems associated with field devices. For example, an operator at the control room and a maintenance person in the field may be required to coordinate efforts to capture the signature of a valve For example, to stroke the valve using the process control system, the maintenance person may need to request a set point change from the operator, and the operator may be busy monitoring and addressing live processes. Furthermore, in some instances, it may be desirable to evaluate a field device when the field device is disconnected from the process control system (e.g., when the device is in a maintenance shop, or before the device is installed on the line). In these and other similar cases, it may be beneficial to analyze the performance of field devices locally (e.g., in the field, in the maintenance shop, and so on).

Devices may be analyzed locally in the field using handheld field maintenance tools. Since at least some process installations may involve highly volatile, or even explosive, environments, it is often beneficial, or even required, for the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research January, 2007. An example handheld field maintenance tool that complies with intrinsic safety requirements is the Model 375 Field Communicator (discussed in U.S. Published Application No. 2008/0075012 entitled "Handheld Field Maintenance Bus Monitor," hereby expressly incorporated by reference herein and commonly assigned) sold by Emerson Process Management.

While handheld field maintenance tools are very helpful in monitoring field devices locally, they are typically configured to physically couple to field devices, which may not be easily accessible in the field. Furthermore, even those handheld field maintenance tools that are equipped with wireless capabilities (such as those disclosed in U.S. Publication No. 2008/0268784 entitled "Wireless Process Communication Adapter for Handling Field Maintenance Tool," and U.S. Pat. No. 7,426,452 entitled "Dual Protocol Handheld Field Maintenance Tool with Radio-Frequency Communication," hereby expressly incorporated by reference herein) may include sophisticated features and interfaces and, as a result, may be less intuitive for a user.

SUMMARY

In general, a method and apparatus provide a portable communicator for operating a field device. The portable communicator is configured to communicate with the field device to configure and/or analyze performance of a field device in an efficient manner. In some embodiments, the portable communicator includes an intuitive user interface that allows the user to perform a relatively limited set of procedures on a field device. These procedures, which may be basic procedures such as the stroke test on a valve, may be largely preconfigured with fixed preprogrammed settings. Because of a limited set of procedures and settings, the user may not be required to navigate sophisticated menus and configuration screens. As a result, time associated with performing common procedures on field devices may be saved, and the number of errors associated with those procedures may be reduced.

The portable communicator may communicate with the field device via a wire and/or wirelessly. In one embodiment, the portable communicator is a Bluetooth-enabled smartphone, a PDA, a pocket PC, or any Bluetooth-enabled generic mobile communication device. The portable communicator may communicate with the field device via a wireless communication unit coupled to the field device. The wireless communication unit may be external or internal to the field device. In some embodiments, the wireless communication unit may be coupled to the field device via auxiliary terminals of the field device. In some embodiments, the wireless communication unit may be coupled to the field device via a control loop. In some embodiments, the wireless communication unit may be coupled directly to a component, or a subcomponent, of the field device.

The portable communicator may communicate with the wireless communication unit via the Bluetooth standard. The wireless communication unit may include a protocol interface to convert Bluetooth signals to signals compatible with the field device and vice versa. In some embodiments, the wireless communication unit may include a protocol interface to convert Bluetooth signals to HART® signals and vice versa.

In at least some of the embodiments, the portable communicator may include an interface for stroking a valve. The user interface may include a suite of selectable preprogrammed set points for stroking the valve. The user interface may further include a jogger to stroke the valve at a custom set point not included in the suite of preprogrammed set points. The user interface may further include a results window configured to display results of the stroke tests. Results of the stroke test may be displayed in numeric and/or text form. Results of the stroke test may also be displayed in a graphical form. In some embodiments, the portable communicator may display test results while the test is in process. In some of these embodiments, the portable communicator may display test results in real time. In other embodiments, the portable communicator may display test results in post-time. The portable communicator may further save the results to a file.

In another aspect, a software system provides an intuitive interface for interacting with a field device operating in a process control environment. In at least some of the embodiments, the software system can operate on a variety of hardware platforms (e.g., a cellular phone or a smartphone, a PDA, etc.) To this end, the software system may be compatible with a virtual machine such as Java Virtual Machine (JVM), for example. Additionally or alternatively, the software system can operate on a specialized portable communicator such as Model 375 Field Communicator, for example. In some embodiments, the software system includes some or all of a communication interface module for exchanging data with one or several field devices; a test logic module for sending commands to a field device, analyzing the corresponding responses, trending test results, converting device data to another format, etc.; a control module for formatting and sending commands to a field device via the communication interface module; and a user interface module for displaying options to a user on a screen, for example, receiving commands from a keypad, a touch-screen, an audio module, etc.

Details of particular embodiments of the invention are set forth in the accompanying drawings and in the description below. Further features, aspects, and advantages of the invention will become apparent from the description and the drawings

DETAILED DESCRIPTION OF THE DRAWINGS

DETAILED DESCRIPTION

Figure 1:
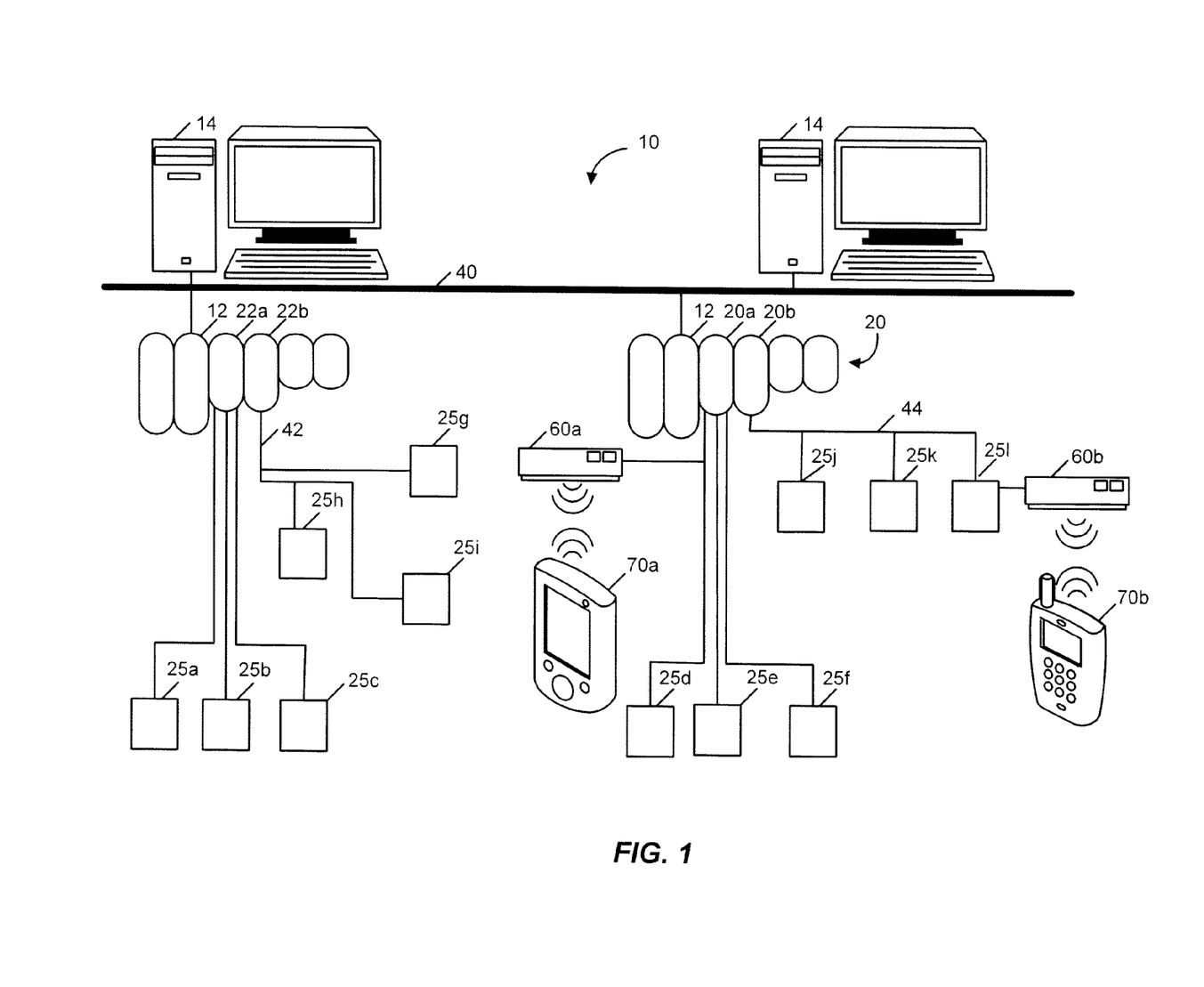
FIG. 1. illustrates an example process control system environment in which a portable communicator may be used.

FIG. 1 illustrates an example process control system 10. The process control system 10 includes one or more process controllers 12 connected to one or more host workstations or computers 14 (which may be any type of personal computer or workstation) and connected to banks of input/output (I/O) devices, including the I/O devices 20a, 20b and the I/O devices 22a, 22b, each of which, in turn, is connected to one or more field devices 25. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25 using any desired hardware and software associated with, for example, standard 4-20 ma devices and/or any smart communication protocol such as the Fieldbus or HART protocols. As is generally known, the controllers 12 implement or oversee process control routines stored therein or otherwise associated therewith and communicate with the devices 25-36 to control a process in any desired manner.

The field devices 25 may be any types of devices, such as sensors, valves, transmitters, positioners, etc. while the I/O cards within the banks 20a, 20b, 22a, and 22b may be any types of I/O devices conforming to any desired communication or controller protocol such as HART, Fieldbus, Profibus, etc. In the embodiment illustrated in FIG. 1, the field devices 25a-25c are standard 4-20 ma devices that communicate over analog lines to the I/O card 22a. The field devices 25d-25f are illustrated as HART devices connected to a HART compatible I/O card 20a. Similarly, the field devices 25j-25l are smart devices, such as Fieldbus field devices, that communicate over digital bus 42 or 44 to the I/O cards 20b or 22b using, for example, Fieldbus protocol communications. Of course, the field devices 25 and the banks of I/O cards 20a, 20b, 22a and 22b could conform to any other desired standard(s) or protocols besides the 4-20 ma, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 ma devices and some types of smartfield devices, or may be stored in and implemented by the field devices themselves, which may be the case with Fieldbus devices. While the description of the control system is provided herein using function block control strategy, the control strategy could also be implemented or designed using other conventions, such as ladder logic, sequential flow charts, etc. and using any desired proprietary or non-proprietary programming language.

The process control system 10 includes one or more wireless communication units 60 that may provide wireless operations to field devices 25. Wireless communication units 60 may include local power storage devices, such as replaceable batteries. Wireless communication units 60 may comply with intrinsic safety requirements. Although FIG. 1 illustrates wireless communication units 60 as standalone external devices, the wireless communication units 60 may also be internal units, e.g., embedded into devices 25.

In some embodiments, wireless communication units 60 may be equipped with a wireless communication protocols, such as Bluetooth. As a result, wireless communication units 60 can allow field devices 25 to communicate wirelessly with portable communicators 70 (e.g., smartphones, PDAs, pocket PCs, and so on) that have Bluetooth capabilities. An example wireless communication unit 60 is the VIATOR® Bluetooth Interface Model 010041 for use with HART® field devices sold by MACTek® Corporation.

Figure 2A:
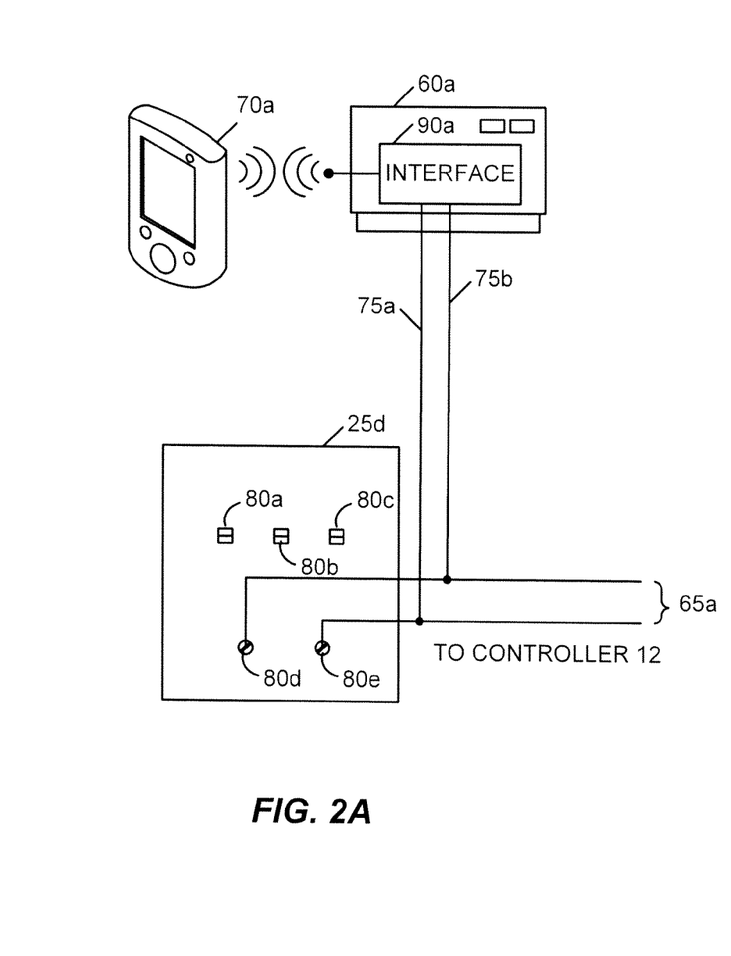
FIG. 2A illustrates one example coupling between a wireless communication unit and a field device.
Figure 2B:
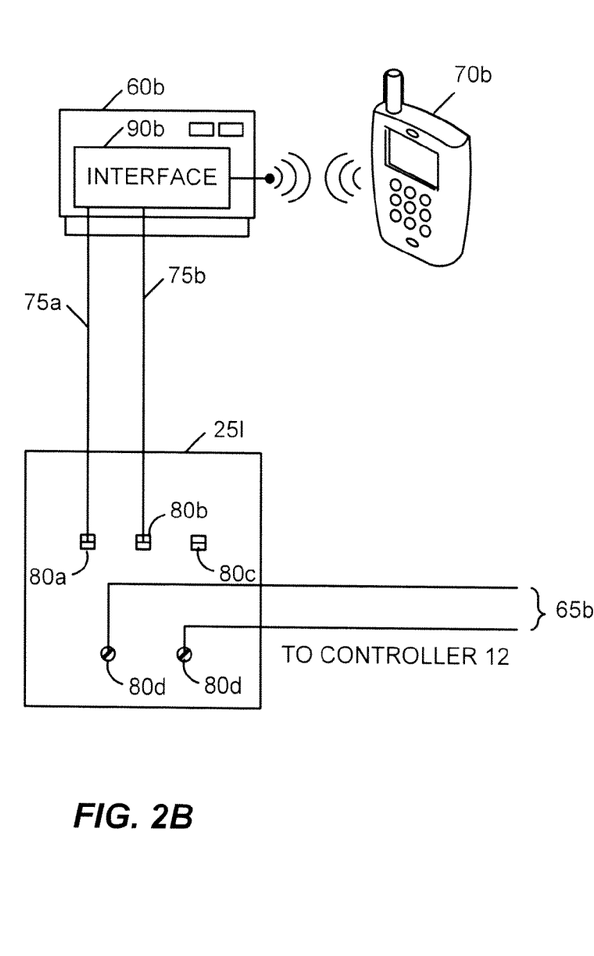
FIG. 2B illustrates another example coupling between a wireless communication unit and a field device.

Wireless communication units 60 may be coupled to field devices 25, such as a digital valve controller (DVC) in a number of ways, and FIGS. 2A-2B illustrate a few examples of coupling. Referring FIG. 2A, in some embodiments a wireless communication unit 60a may be coupled to a field device 25d via a process instrumentation control loop. The wireless communication unit 60a may be coupled to the control loop 65 with leads 75, mini-grabber clips, and so on. Referring to FIG. 2B, a wireless communication unit 60b may also be coupled to a field device 25l via auxiliary terminals 80 of the field device (also using leads, mini-grabber clips, and so on). In such and similar configurations, a wireless communication unit 60 may include a protocol interface 90 configured to convert signals compatible with portable communicators 70 to signals compatible with field devices 25 and vice versa. For example, if the portable communicator 70 is a Bluetooth-enabled PDA, and a field device 25 is a HART-compatible device, the protocol interface 90 may be configured to convert Bluetooth signals to HART signals and vice versa.

Alternatively, wireless communication units 60 may be coupled directly to particular components, or subcomponents, of field devices. For example, a wireless communication unit 60 may be coupled to a microprocessor of the positioner included in a digital valve controller (DVC). In such alternative configuration (not shown), a protocol interface such as the Bluetooth-HART interface discussed above in reference to FIGS. 2A-2B may not be required, and a portable communicator 70 may communicate directly with field devices 25 using, for example, the Bluetooth standard.

Portable communicators 70 described above may be used to configure field devices 25 and to generally analyze the performance of and detect problems with the field devices 25 (e.g., in the field, in the maintenance shop, and so on). For example, a portable communicator 70 may be used to perform a stroke test (also referred to as stroking a valve), e.g., to capture the signature of the valve, as described above, or to monitor the actual performance of the valve against a signature. Likewise, a portable communicator 70 may be used to generally estimate loop parameters, such as friction, dead band, dead time, oscillation, shaft windup or backlash of a field device.

Figure 3:
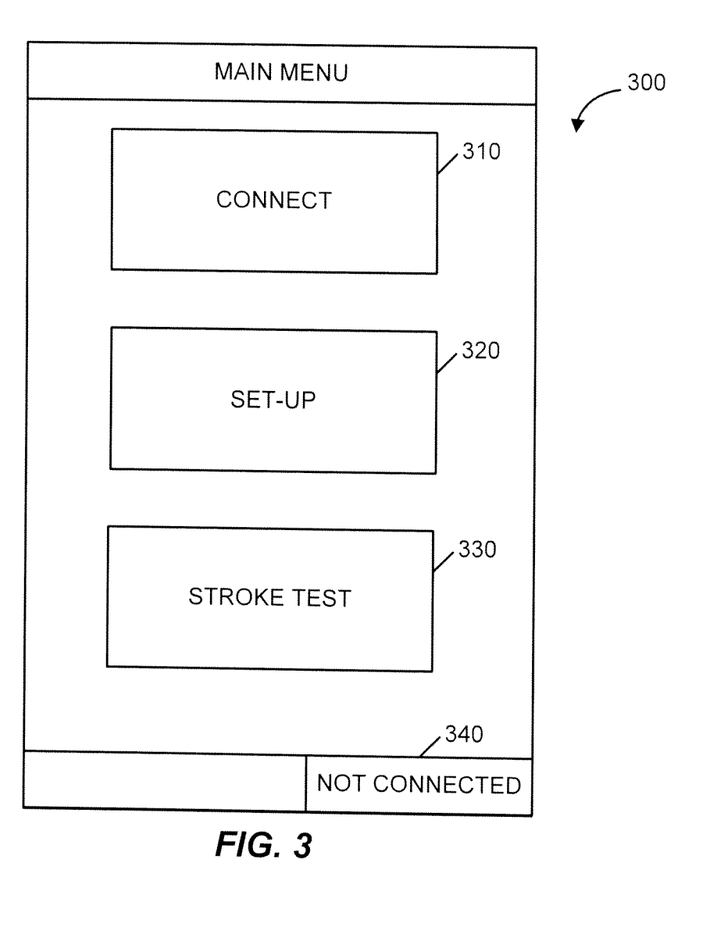
FIG. 3 illustrates an example user interface on a portable communicator.

FIG. 3 illustrates a general example user interface 300 of a portable communicator 70. In an embodiment, the user interface 300 generally provides the user with basic and limited capability to configure, analyze the performance of, and detect problems with field devices 25. For example, the user interface 300 may provide the user with preconfigured settings and operations and offer the user relatively limited ability to reconfigure these settings and operations. Because of a limited set of his limited ability to reconfigure settings and operations, the user may generally avoid having to navigate through numerous sophisticated menus and configuration screens. This may result in relatively shorter set-up times and fewer human errors.

In some embodiments, the user interface 300 allows the user to establish and/or tear down a wireless connection between the portable communicator 70 and a field device 25. For example, the user may generally connect to a field devices 25, e.g., by selecting "CONNECT" 310 on the user interface 300. In some embodiments, the user interface 300 may allow the user to connect to a particular field device 25 (e.g., out of a list of multiple field devices 25 coupled to a given wireless commination unit 60). For example, if the wireless communication unit 60 with which the portable communicator 70 is communicating is coupled to a process instrumentation control loop that supports a multi-drop HART configuration (and thus includes multiple field devices 25), the user may be able to view the list of field devices 25 coupled to the loop and connect to a specific field device 25 on the list. In other words, the user interface 300 allows the user to poll devices coupled to the loop.

In some embodiments, the user interface 300 includes a status window 340 configured to display to the user the status of the wireless connection between the portable communicator 70 and the wireless communication unit 60 coupled to a field device 25 and/or the status of the field device 25 itself. For example, if there is no active wireless connection between the portable communicator 70 and the wireless communication unit 60, the status window 340 may display "NOT CONNECTED" to the user. On the other hand, if there exists a wireless connection between the portable communicator 70 and the wireless communication unit 60, the status window 340 may display the status of the field device 25. For example, if the field device 25 is performing an operation (e.g., initiated by another user or generally by the process control system 10), the status window 340 may display "IN SERVICE," indicating to the user that the field device 25 is unavailable for configuration. In some embodiments, when the field device 25 is "IN SERVICE" the portable communicator 70 may still be used to monitor parameters (e.g., set points) of the field device 25, but the user may be prevented from overriding these parameters until the device is, for example, "OUT OF SERVICE."

In some embodiments, the user interface 300 also provides the user with basic set-up functions. For instance, to prevent inadvertent missteps (e.g., shutting down a field device 25 when the field device 25 is performing an important process-related function), a user may set up the portable communicator 70 at "SET-UP" 320 to operate in a read-only mode (e.g., to be able to monitor but not configure or override parameters of field devices 25). The user interface 300 further provide the user with limited ability to, for example, configure control mode, a restart control mode, a zero-power condition, a valve style, an actuator style, a relay type, a feedback connection, and so on.

In some embodiments, the user interface 300 also allows the user to perform a limited set of basic procedures, e.g., tests for analyzing performance of a field device 25. These procedures may be largely preconfigured, e.g., with predefined settings. For example, the user may select "STROKE TEST" 330 on the interface 300 of the portable communicator 70 to perform a stroke test at preprogrammed set points (e.g., 0%, 25%, 50%, 100%, and so on). Because of a limited set of settings, the user may not be required to navigate through numerous menus and configuration screens. As a result, time associated with performing common procedures on field devices 25 may be saved, and the number of errors associated with those procedures may be reduced. It will be appreciated by one of ordinary skill in the art that the stroke test is described below only as one example of numerous basic procedures that may be performed using the using a portable communicator 70. Other procedures including EnTech step test, step test, ramp test, sine waves test, square wave test, triangular waves test, and so on.

Figure 4:
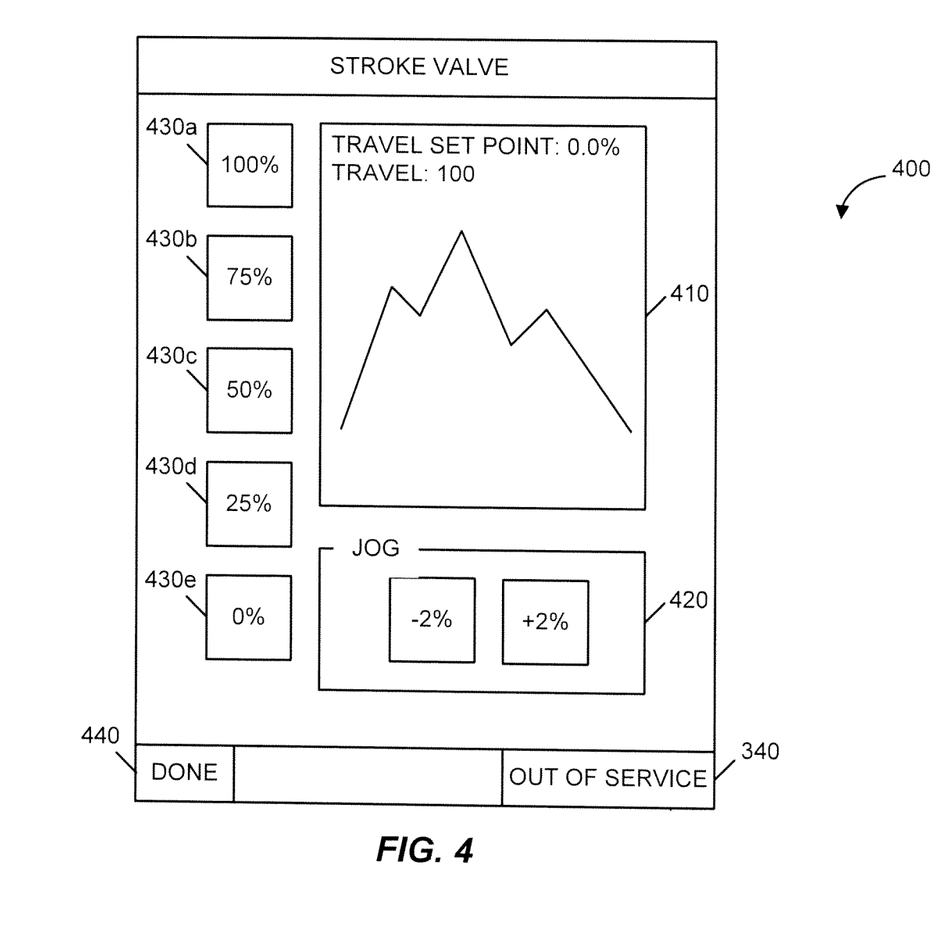
FIG. 4 illustrates an example user interface on a portable communicator for performing a stroke test.

FIG. 4 illustrates an example user interface 400 on a the portable communicator 70 for performing a stroke test. The user interface includes a suite of selectable preprogrammed set points 430 that a user may choose for stroking the valve. To accommodate users who operate portable communicators 70 primarily with their right hand, the predefined set points 430 may be placed on the right side of the user interface 400 so that they are easily accessible with the right hand. However, predefined set points 430 may be placed anywhere on the user interface 400 (e.g., on the left side of the user interface 400 to accommodate those users who operate portable communicators 70 primarily with their left hand).

In some embodiments, the user interface 400 further includes jogger 420. A user may use the jogger 420 to stroke the valve at a set point that is not included in the suite of preprogrammed set points 430. The user may do so by selecting a set point from the suite of preprogrammed set points 430 and jog the selected set point up or down using the jogger 420. In some embodiments, the jogger 420 may allow the user to jog preprogrammed set points 430 in +2% or –2% increments using buttons. Alternatively, the jogger 420 may include one or more sliders (e.g., one coarse slider and one fine slider) for adjusting set points, or other controls which may be physical or virtual/logical.

In some embodiments, the user interface 400 further includes a results window 410 configured to display results of the stroke tests. Displayed results are not limited to raw data generated by the test and may include calculations based on the received data. In some embodiments, displayed results may include quantified dynamic responses (e.g., integrated absolute error, overshoot, dead time, T63, T86, T98, and so on) and other data, such as net actuator pressure, I/P drive signal, input current, pre-characterization set point, post-characterization set point, etc. Results of the stroke test may be displayed in numeric and/or text form. Results of the stroke test may also be displayed in a graphical form (e.g., time series graph, color-based indicators, and so on).

In some embodiments, the user interface 400 further includes a status window 340 similar to the status widow discussed in reference to FIG. 3 that may configured to display, for example, the status of the wireless connection between the portable communicator 70 and the valve and/or the status of the valve. Additionally, the interface 400 includes a message window 440 that may display information related the stroke test (e.g., current stage in the test, alarms and failures, and so on).

Using the interface 400 described above in reference to FIG. 4, a user can perform a stroke test and receive results of the test quickly and efficiently, using a limited set of operations within in a relatively short period of time. More specifically, the user can initiate the stroke test by selecting a desired set point from predefined set points 430 on the user interface 400 (and optionally jogging the selected predefined net point 430). The portable communicator 70 may communicate to a wireless communication unit 60 associated with the valve, e.g., via Bluetooth, a command to stroke the associated valve at the selected set point. In some embodiments, as described above with reference to FIGS. 2A-2B, the wireless communication unit 60 may convert the Bluetooth signal into a signal compatible with the DVC associated with the valve and forward the converted signal (e.g., a HART signal) to the DVC. In response to the converted signal, the DVC may stroke the valve at a specified set point and provide results to the wireless communication unit 60. The wireless communication unit 60 may forward the results to the portable communicator 70 (e.g., using the Bluetooth standard), and the portable 70 communicator may display the results via the user interface 400 in the results window 410.

In some embodiments, the DVC may further provide test results to the wireless communication unit 60 (which may, in turn, forward the results to the portable communicator 70) while the test is being performed. Accordingly, the portable communicator 70 may display test results while the test is in process. In some embodiments, the portable communicator 70 may display test results in real time. In addition to, or instead of, displaying results in the results window 410, the portable communicator 70 may save the results, e.g., to a file that be transferred via a serial port, a wireless link, and so on.

Figure 5:
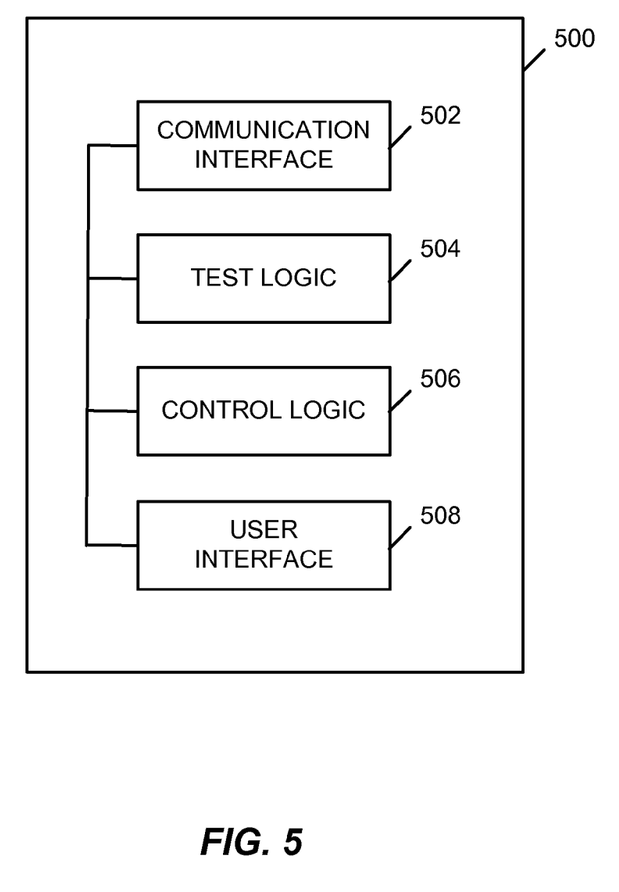
FIG. 5 schematically illustrates several modules of a software system that may execute on a portable communicator of FIGS. 1-4.

Referring to FIG. 5, a software system 500 for performing configuration, control and/or test functions on a field device may be compatible with a number of hardware platforms. For example, the software system 500 may execute on an embedded or standard (non-embedded) device. Further, the software system 500 may be compatible with standard operating systems such as Windows or Linux, for example, and/or with mobile operating systems such as Symbian OS, Android, etc. In one embodiment, the software system 500 is a Java application executable on a Java Virtual Machine (JVM). In one particular embodiment, the software system 500 executes on the portable communicator 70a or 70b.

As illustrated in FIG. 5, the software system 500 may include a communication interface module 502 for exchanging data over a wired or wireless communication link. In particular, the interface module 502 may include one or several drivers for supporting such communication standards as Bluetooth, for example. Additionally, the communication interface module 502 may include one or several drivers for supporting protocols specific to the process control industry (e.g., HART, Foundation® Fieldbus, Profibus, etc.)

A test logic module 504 and a control logic module 506 may include test and command functionality, respectively. The test logic module 504 may implement one or several routines for driving a valve to a certain setpoint (i.e., stroking the valve), obtaining time, pressure, position, etc. measurements from the valve via the module 502, and comparing the results to a predefined target or threshold. If desired, the test logic module 504 may also support trending and historical analysis functionality. The user may select a desired test routine via the user interface (e.g., interface 300), activate the test using a physical or logical control, and the test logic module 504 may exchange a series of commands and responses with the target field device as part of the selected test routine. In general, it will be appreciated that the test logic module 504 may support any desired test functionality for a valve or any other field device.

Similarly, the control logic module 506 may support control functions for any field device including a digital valve controller, for example. In some embodiments, the control logic module 506 may store a set of predefined setpoints which a user may select to perform a desired control function. For example, the user may wish to visually observe the operation of a particular valve when the valve travels from an open position to a 25% closed position. To this end, the control logic module 506 may support a command for stroking the valve to the 25% closed position which the user may easily select via the user interface, preferably by performing only few keystrokes or touch-screen selections. In some embodiments, the control logic module 506 may support configuration functions so that the user may, for example, download a desired configuration to a field device using the software system 500.

Further, the user interface module 508 may support an intuitive and efficient user interface such as described above with reference to FIG. 3, for example. In addition to physical (i.e., buttons, keys, etc.) and logical (i.e., scrollbars, virtual on-screen buttons, etc.) controls, it is contemplated that the user interface module 508 may receive commands via audio commands or any other suitable means including those known in the art.

In general, it will be noted that the software system 500 may include only some of the modules 502, 504, 506, and 608 described above. Moreover, it will be appreciated that some of these modules may be combined or distributed further, if desired. In one such embodiment, for example, the software system 500 may include only the test logic module 504 and a user interface module 508, and an independent software or firmware module may provide a wired or wireless communication interface to the system 500.

From the foregoing, it will be appreciated that the wired and/or wireless portable communicator 70 allows users to physically approach a field device such as a valve and perform device configuration and/or testing while visually and aurally observing the operation of the field device. To take one example, an operator may know, from his or her experience, that a certain screeching sound during operation of a valve typically indicates an abnormality. Because data collected remotely may not always reflect this abnormality, or because the operator can reliably interpret these and other "non-technical" clues, the operator may prefer to perform the test locally while observing the valve. Using the portable communicator 70, the operator may quickly and efficiently trigger a test from a location physically proximate to the field device.

In another respect, the operator may install the software system 500 on a smartphone which the operator typically carries in his or her pocket. In this manner, the operator need not carry a more bulky device such as a laptop when walking or driving from one part of the plant to another part of the plant. On the other hand, because the software system 500 (in at least some embodiments) is compatible with a standard operating system, the operator need not purchase a specialized instrument for communicating with field device. In yet another respect, wireless embodiments of the portable communicator 70 and wireless applications of the software system 500 allow the operator to access field devices more easily and therefore enjoy greater flexibility as well as safety. It is known, for example, that operators are sometimes forced to climb high ladders to access a wire contact.

Figure 6:
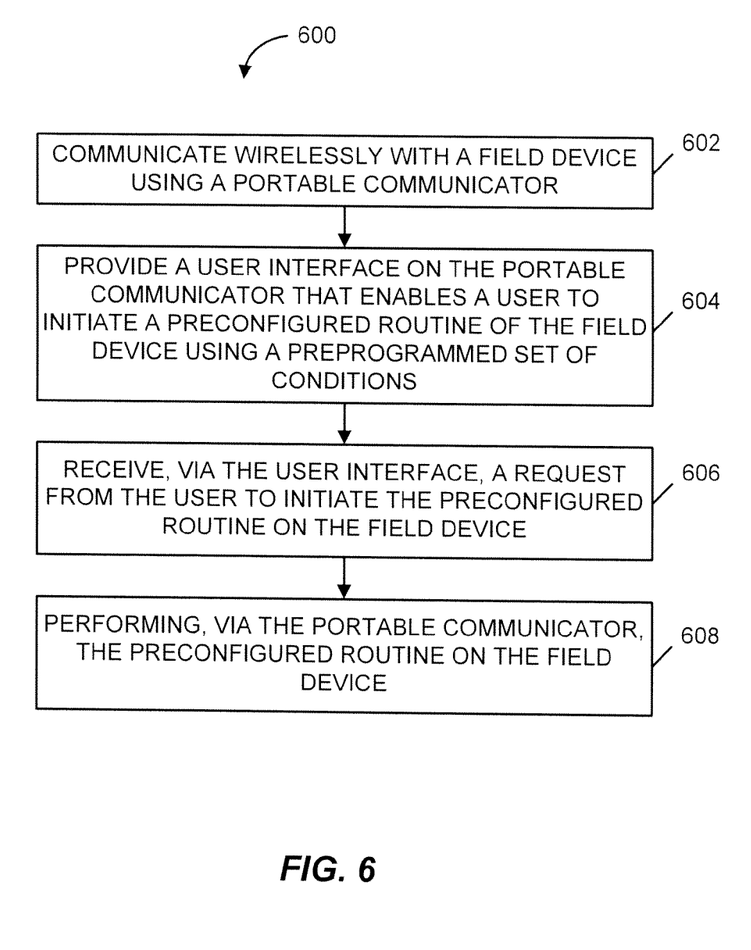
FIG. 6 illustrates an example method for performing a routine on a field device in a process control system using a portable communicator of FIGS. 1-4.

FIG. 6 illustrates an example method 600 for performing a routine on a field device in a process control system using a portable communicator described above. The portable communicator may be used to communicate wirelessly with the field device without communicating with any of the controllers (block 602). As explained above, a user interface may be provided on the portable communicator to enables a user to initiate a preconfigured routine on the field device using a preprogrammed set of conditions (block 604), as discussed in reference to FIG. 4, for example. The user may initiate the preconfigured routine, and the request to initiate the preconfigured routine may be received at the portable communicator (block 606). In response to the request, the preconfigured routine may be performed via the portable communicator (block 608).

While the present invention has been described with reference to specific examples, which are intended to be illustrative only and not to be limiting of the invention, it will be apparent to those of ordinary skill in the art that changes, additions and/or deletions may be made to the disclosed embodiments without departing front the spirit and scope of the invention. It is intended that the specification and examples be considered as exemplary only, with a true scope and spirit of the invention being indicated by the following claims.

The invention claimed is:

1. A portable communicator for use in a process control system, the process control system including a controller coupled to a field device, the controller configured to communicate with the field device to control a physical process parameter or to measure a physical process control parameter in a process plant, the portable communicator comprising:
    a processor;
    a computer-readable memory having computer-readable instructions executable on the processor;
    a communication interface configured to communicate wirelessly with the field device via a Bluetooth modem coupled directly to the field device and without communicating via the controller, wherein the communication interface is further configured to convert between Bluetooth protocol and HART protocol and to display a connection status between the portable communicator and the field device and/or the connection status of the field device itself; and
    a software application stored on the computer readable memory and configured to execute on the processor to send data to the field device or to receive data from the field device via the communication interface and not via the controller, and configured to prevent a user of the portable communicator from overriding parameters of the field device through the portable communicator when the connection status of the field device displayed at the communication interface is in service.

2. The portable communicator of claim 1, wherein the Bluetooth modem is external to the field device.

3. The portable communicator of claim 1, wherein the Bluetooth modem is internal to the field device.

4. The portable communicator of claim 1, wherein the Bluetooth modem is coupled via a control loop associated with the field device.

5. The portable communicator of claim 1, wherein the field device is a valve, and wherein the software application stored on the computer readable memory is further configured to execute on the processor to stroke the valve.

6. The portable communicator of claim 5, wherein the software application stored on the computer readable memory is configured to execute on the processor to stroke the valve at two or more predetermined set points, wherein the communication interface further comprises a jogger that allows the user of the portable communicator to stroke the field device upward or downward.

7. The portable communicator of claim 1, wherein the software application stored on the computer readable memory is further configured to execute on the processor to provide a user with a preprogrammed limited set of conditions for performing a preconfigured routine on the field device via the communication interface.

8. The portable communicator of claim 7, wherein the field device is a valve, and wherein the preconfigured routine is a stroke test on the valve using a preprogrammed set of discrete set points for the stroke test.

9. The portable communicator of claim 8, wherein the preprogrammed set of discrete set points for the stroke test comprises 0%, 25%, 50%, 75% and 100%.

10. The portable communicator of claim 7, further comprising a display, wherein the software application stored on the computer readable memory is further configured execute on the processor to present a result of the routine on the display.

11. A process control system comprising:
    a field device;
    a controller coupled to the field device, the controller configured to communicate with the field device to control a physical process parameter or to measure a physical process control parameter in a process plant; and
    a portable communicator comprising:
        a processor;
        a computer-readable memory having computer-readable instructions executable on the processor;
        a communication interface configured to communicate wirelessly with the field device, via a wireless communication unit coupled directly to the field device, and without communicating via the controller, wherein the wireless communication unit is configured to operate according to a first communication protocol, and wherein the communication interface is further configured to convert between the first communication protocol and a second communication protocol, and to display a connection status between the portable communicator and the field device and/or the connection status of the field device itself; and
        a software application stored on the computer readable memory and configured to execute on the processor to send data to the field device or to receive data from the field device via the communication interface and not via the controller, and configured to prevent a user of the portable communicator from overriding parameters of the field device through the portable communicator when the connection status of the field device displayed at the communication interface is in service.

12. The process control system of claim 11, wherein the wireless communication unit is external to the field device.

13. The process control system of claim 12, wherein the software application stored on the computer readable memory is configured to execute on the processor to stroke the valve at two or more predetermined set points.

14. The process control system of claim 12, wherein portable communicator is a generic mobile communication device selected from a group comprising 1 smartphone, a personal digital assistant (PDA), and a pocket personal computer (PC).

15. The process control system of claim 11, wherein the wireless communication unit is internal to the field device.

16. The process control system of claim 11, wherein the wireless communication unit is coupled via a control loop associated with the field device.

17. The process control system of claim 11, wherein the field device is a valve, and wherein the software application stored on the computer readable memory is further configured to execute on the processor to stroke the valve.

18. The process control system of claim 11, wherein the software application stored on the computer readable memory is further configured to execute on the processor to provide a user with a preprogrammed limited set of conditions for performing a preconfigured routine on the field device via the communication interface.

19. The process control system of claim 18, wherein the field device is a valve, and wherein the preconfigured routine is a stroke test on the valve using a preprogrammed set of discrete set points for the stroke test.

20. The process control system of claim 19, wherein the preprogrammed set of discrete set points for the stroke test comprises 0%, 25%, 50%, 75% and 100%.

21. The process control system of claim 18, wherein the portable communicator further comprises a display, and wherein the software application stored on the computer readable memory is further configured execute on the processor to present a result of the routine on the display.

* * * * *